United States Patent
Ball

(10) Patent No.: US 8,393,110 B2
(45) Date of Patent: Mar. 12, 2013

(54) LIVE SPORT FISH PROTECTION SYSTEM

(76) Inventor: Thomas Ball, Bumpass, VA (US)

( * ) Notice: Subject to any disclaimer, the term of this patent is extended or adjusted under 35 U.S.C. 154(b) by 821 days.

(21) Appl. No.: 11/731,838

(22) Filed: Apr. 2, 2007

(65) Prior Publication Data

US 2007/0169400 A1    Jul. 26, 2007

Related U.S. Application Data

(63) Continuation-in-part of application No. 10/636,678, filed on Aug. 7, 2003, now abandoned.

(60) Provisional application No. 60/401,582, filed on Aug. 8, 2002.

(51) Int. Cl.
*A01K 97/04* (2006.01)
*A01K 97/05* (2006.01)

(52) U.S. Cl. ............................................. 43/4.5; 43/55

(58) Field of Classification Search ............... 43/55, 4.5; D3/273; D30/109; D22/136; 119/497; 206/315.11; 383/6

See application file for complete search history.

(56) References Cited

U.S. PATENT DOCUMENTS

| | | | | |
|---|---|---|---|---|
| 1,725,864 A | * | 8/1929 | James | 43/55 |
| 1,910,789 A | * | 5/1933 | Brady | 383/6 |
| 2,253,688 A | * | 8/1941 | Collins | 43/55 |
| 2,377,311 A | * | 6/1945 | Campbell | 383/121.1 |
| 2,603,028 A | * | 7/1952 | Roberts | 43/55 |
| 2,722,770 A | * | 11/1955 | Giordano | 43/55 |
| 4,498,190 A | * | 2/1985 | Garlick, III | 383/28 |
| 5,170,745 A | * | 12/1992 | Burdette, Jr. | 119/497 |
| 6,027,248 A | * | 2/2000 | Nelson et al. | 383/67 |

* cited by examiner

*Primary Examiner* — Kurt Rowan

(57) ABSTRACT

A storage and transfer bag system are disclosed for use in tournament fishing competitions. A living fish can be stored in the storage bag, which is kept in a live well until the storage bag with living fish therein is placed in a transfer bag that is partially filled with water. The storage bag is made from a mesh fabric, enabling water to be drained from the storage bag. After draining the water from the storage bag, the storage bag and living fish are weighed, and the weight of the fish computed. The storage bag and living fish are then placed back into the transfer bag and transported to the lake or river or other body of water. The storage bag and living fish are removed from the transfer bag and the fish released without human contact.

2 Claims, 2 Drawing Sheets

LIVE SPORT FISH PROTECTION SYSTEM

CROSS-REFERENCE TO RELATED APPLICATIONS

This application is a continuation-in-part of U.S. patent application Ser. No. 10/636,678, filed Aug. 7, 2003 now abandoned, which claimed benefit of U.S. Provisional Patent Application No. 60/401,582 filed Aug. 8, 2002.

BACKGROUND OF THE INVENTION a. Field of the Invention

This invention belongs in the field associated with fishing, for holding and transporting fish that have been caught and will be released in a health condition. This invention is also related to animal husbandry and the transportation and care of fish after they are caught.

b. Prior Art

The prior art demonstrates receptacles for holding many fish, either in a mesh-like enclosure in a larger body of water or in a self-enclosed system for transport. There is no prior art that allows for a single fish to be held individually in a mesh system in a larger body of water such as a live well. Additionally, the prior art is devoid of a combined system whereby a plurality of primary mesh-like enclosures are transported from a live-well together in a secondary transfer bag.

SUMMARY OF THE INVENTION

In operation, a game or sport fish is caught by the angler, and is individually inserted into a mesh-bag that is closed with sealing means along the top of the bag. The bag with fish inside may be then weighed, released or placed in a live well. The bag serves to protect the fish from the live well environment and the damage caused by human contact, while allowing the fish to be easily identified and retrieved.

It has long been known that when a fish is to be ultimately released, human handling must be kept to a minimum. Human contact can transmit fungus or other contagious disease to the fish's skin. Contact with the fish can also be deleterious to the fish's mucous layer, that lubricates the fish when they swim. Using the instant invention, fish can be stored in a live, healthy condition, avoiding unnecessary touching of the fish, enabling a greater degree of safety to the fish. Therefore, the fish can be released in a healthier condition. Also, when the fish are weighed, the instant invention provides a suitable means to separate the water from the fish, enabling immediate weighing without human contact with the fish, thereby allowing the entire process from the initial capture to final release to occur without any direct human contact.

Zipper (1) extends along the side and top edges of the mesh-bag . Typically, a polymeric zipper is preferred, although any zipper material conventional in the art may be employed. Loop member (2) is attached to the bag as shown, for hanging the bag and weighing the bag and contents.

Figure 2:
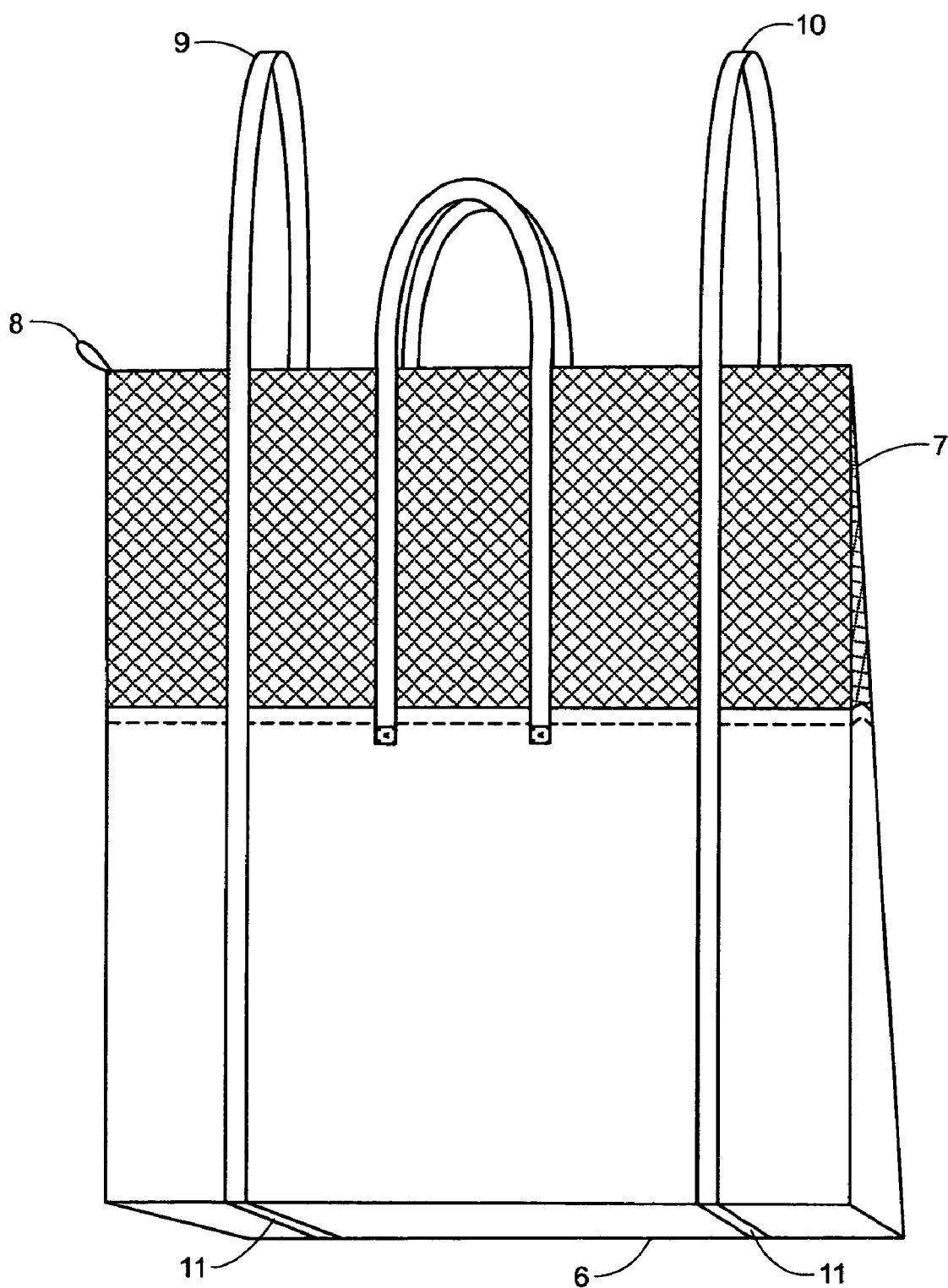

FIG. 2 shows a transfer bag according to the invention. Mesh-bags with fish therein are transferred from the live-well of a boat or other reservoir to a weighing station using the transfer bag. A dark plastic bottom (6) is found on the lower portion of the transfer bag. The upper portion of the bag (7) is constructed of mesh-like material similar to the mesh-bag that holds the fish. A zipper (8) seals the upper seam along the top of the transfer bag. Handles (9) and (10) are provided to enable carrying the transfer bag. Similar to the construction of the storage mesh-bags, the handles incorporate boning (11) to hold the transfer bag sides a suitable distance apart.

DETAILED DESCRIPTION OF THE INVENTION

Figure 1:
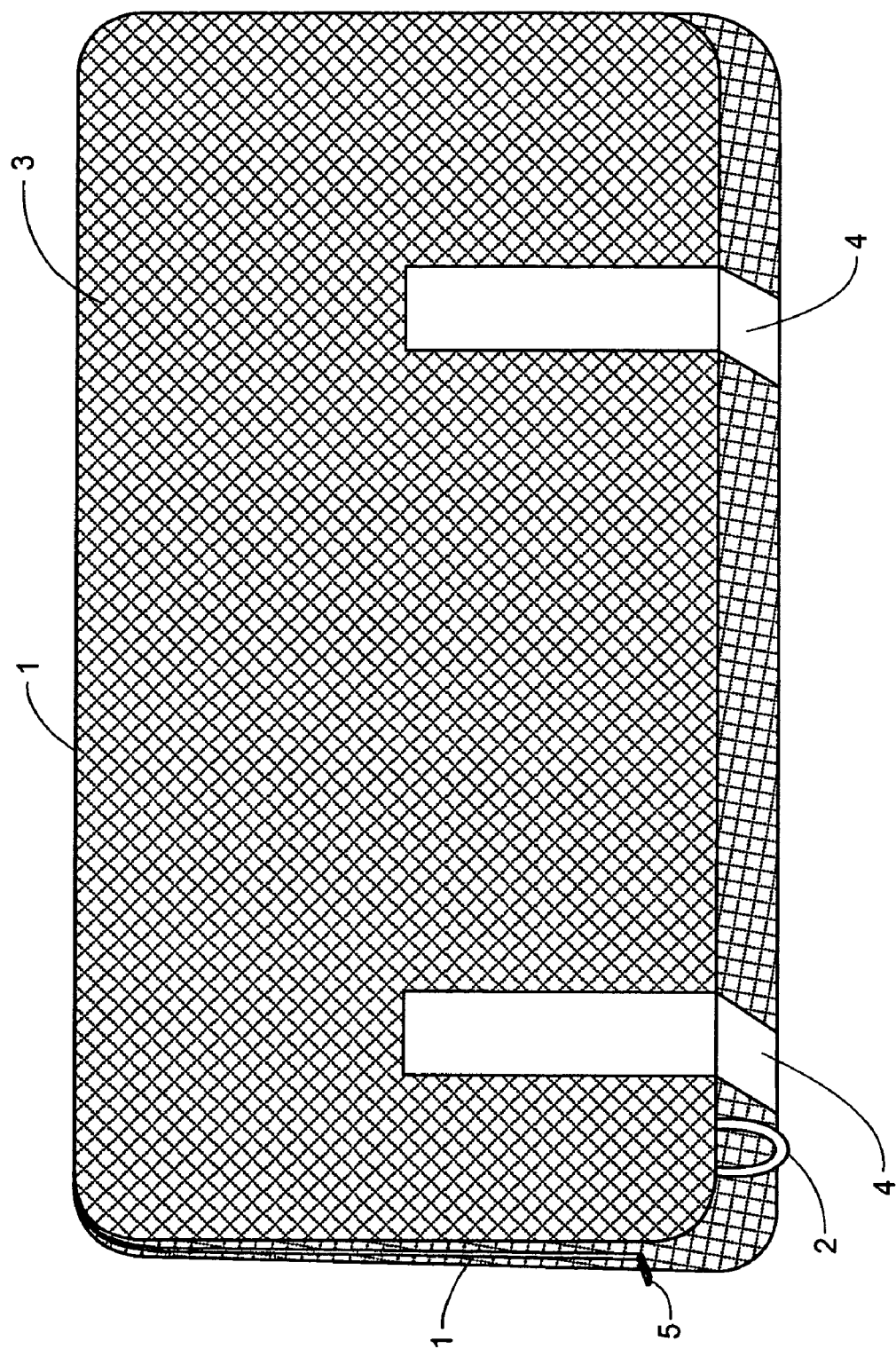
FIG. 1 shows a bag according to the invention, which is intended to releaseably hold fish in a live-well or other water reservoirs. The bag is specifically designed to hold the fish in a healthy condition facilitating the fishes release later into their natural environment unharmed.

A mesh-bag, of polymeric mesh material (3) such as polyolefin, including polyethylene, polypropylene, or the like, or plasticized polyvinyl chloride, or any suitable polymer or copolymer, is specifically adapted to allow water to circulate throughout the bag interior. Any material, polymeric or coated metallic, or fabric, is within the scope of the invention and it is understood that the exact material is not critical to practice of the invention. Referring to FIG. 1, support boning bands (4) are located along the bottom the bag, and extend upward along the sides of the bag. Support boning bands (4) are intended to keep the bag mesh sides (3) apart sufficiently to enable any fish within the mesh-bag to breath normally. Boning bands (4) may be constructed of resilient polymeric material or polymeric coated metal. Zipper pulls (5) are located on both ends of the bag, as shown in the Figures, so that the bag may be opened or closed from either end. It must be expressly understood, however, that the invention can be practiced with only one zipper pull (5).

Weighing loop (2) is sewn into the end of the storage bag. The loop (2) could be on one or both of the ends of the storage bag. In practice, the fish and bag are weighed together by hanging the fish and bag on a scale using the loop (2). The weight of the bag is subtracted from the total, to obtain the fish weight. Alternatively, the bag could be tarried, and the true fish weight directly read from the scale. Prior to hanging the fish/bag from the scale, obviously all water in the bag is drained through the mesh, enabling an accurate weight to be determined independent of the water. One aspect of the invention is to enable separation of the fish from the attendant water in the live-well, without any human contact with the fish.

In practice, the transfer bag is used to transfer the fish within the support mesh-bag safely. The entire bag is composed of mesh to enable oxygenated water to freely exchange through the bag. A support mesh-bag with fish enclosed is lowered into the transfer bag. The lower portion of the transfer bag is constructed of dark polymeric material, that does not transmit light. Additionally, the lower portion of the transfer bag must be water proof. Water is contained in the lower portion, to act as a live-well while transporting the fish to the weighing station. In this manner, a fish can be transferred to the weighing station without any human contact.

Mesh portion (7) of the transfer bag allows the transfer bag to be easily drained following use. Also, the bag can be stored in a small area after draining water therefrom. Boning elements (11) keep the transfer bag sides separated, enabling the fish to easily breath water within the storage bags, contained within the transfer bags. Handles (9) and (10) allow easy transportation of the transfer bag and storage bag combination.

The storage bags are color coded for easy identification; the mesh construction allows the fish to remain suspended in a live well without suffering damages from other objects and fish in the well. This system removes any need for gill penetration for purposes of culling and identifying fish. For instance, a record may be kept of the each fish's weight in the individually colored bags. Suppose in practice, the red bag contains a four-pound largemouth bass. If later in the day a five-pound largemouth bass is caught, the four-pound bass may be readily identified as the red bag. The fish can be immediately released, and the five-pound bass replaced in the red bag. In this manner, a fisherman can proceed through a day of tournament fishing and constantly upgrade their catch without touching any fish, once they have been enclosed in a storage mesh-bag.

The invention claimed is:
1. A combination of a storage bag and a transfer bag, the storage bag specifically adapted to store live fish within a reservoir of water, and the transfer bag specifically adapted to transfer the storage bag and fish to a weighing station, the storage bag enabling the fish to be weighed and released without human contact, comprising a resilient mesh-like bag constructed of mesh fabric, whereby the storage bag can be inserted within a reservoir of water and enabling water to be available to a fish's gills, and further enabling the storage bag to be drained of water through the mesh fabric, the storage bag having first and second sides, and top and bottom edges, the bottom edge formed by folding the mesh fabric over itself, and the first side, second side, and top edge being releasable sealed together along their edges with a zipper, and further including a resilient boning member folded along the bottom edge and extending upwards and attached to both the first and second side, whereby the resilient boning member acts to keep the first and second sides separated from each other, enabling a fish within the storage bag to breath normally when the storage bag is contained within a reservoir of water, and a loop securely attached to one end of the storage bag, adapted to allow the storage bag to be weighed on a conventional weighing scale, and the transfer bag comprising a water proof lower portion and a mesh fabric upper portion, whereby fish in the storage bag may breath when placed within the lower portion of the transfer bag when filled with water, and a zipper along the top portion of the upper portion of the transfer bag to seal along a top edge of the transfer bag, resilient boning members folded across a bottom edge of the water proof lower portion and extending upwards thereof, to prevent collapse of the transfer bag and allowing a fish to breath within the storage bag within the transfer bag, a mesh fabric top portion of the transfer bag with a zipper seal on a top edge of the upper portion of the transfer bag, enabling the storage bags to be sealed within the transfer bag, and handles on the transfer bag enabling transportation of the transfer bag.

2. A method of storing and weighing a living fish, for tournament fishing competition, wherein after the fish is caught the fish can be stored, weighed, and released without human contact, comprising the steps of placing the living fish in a storage bag, the storage bag specifically adapted to store live fish within a reservoir of water, the storage bag enabling the fish to be weighed and released without human contact, the storage comprising a resilient mesh-like bag constructed of mesh fabric, whereby the storage bag can be inserted within a reservoir of water and enabling water to be available to a fish's gills, and further enabling the storage bag to be drained of water through the mesh fabric, the storage bag having first and second sides, and top and bottom edges, the bottom edge formed by folding the mesh fabric over itself, and the first side, second side, and top edge being releasable sealed together along their edges with a zipper, and further including a resilient boning member folded along the bottom edge and extending upwards and attached to both the first and second side, whereby the resilient boning member acts to keep the first and second sides separated from each other, enabling a fish within the storage bag to breath normally when the storage bag is contained within a reservoir of water, and a loop securely attached to one end of the storage bag, adapted to allow the storage bag to be weighed on a conventional weighing scale, partially filing a transfer bag with water, and transferring the living fish, held within the storage bag, to a transfer bag comprising a water proof lower portion and a mesh fabric upper portion, whereby fish in the storage bag may breath when placed within the lower portion of the transfer bag when filled with water, and a zipper along the top edge of the upper portion of the transfer bag to seal along the top edge of the transfer bag, resilient boning members folded across a bottom edge of the water proof lower portion and extending upwards thereof, to prevent collapse of the transfer bag and allowing a fish to breath within the storage bag that is within the transfer bag, a mesh fabric top portion of the transfer bag with a zipper seal on a top edge of the upper portion of the transfer bag, enabling the storage bags to be sealed within the transfer bag, and handles on the transfer bag enabling transportation of the transfer bag, and withdrawing the storage bag with a living fish therein, draining the water from the storage bag, hanging the storage bag with the living fish therein and weighing the storage bag with the living fish therein, determining the weight of the living fish, placing the storage bag and living fish therein back into the transfer bag with water in the lower portion thereof, transporting the combination of the transfer bag, storage bag, and living fish to a body of water, removing the storage bag and living fish, opening the storage bag, lowering the storage bag with living fish therein into the body of water, and allowing the living fish to swim from the storage bag into the body of water, unharmed and untouched by human hands.

\* \* \* \* \*